Oct. 4, 1966 T. A. DEAR ET AL 3,276,539
SOUND ISOLATING ENCLOSURE FOR INTERNAL
COMBUSTION ENGINE GENERATOR SET
Filed Dec. 23, 1965 3 Sheets-Sheet 1
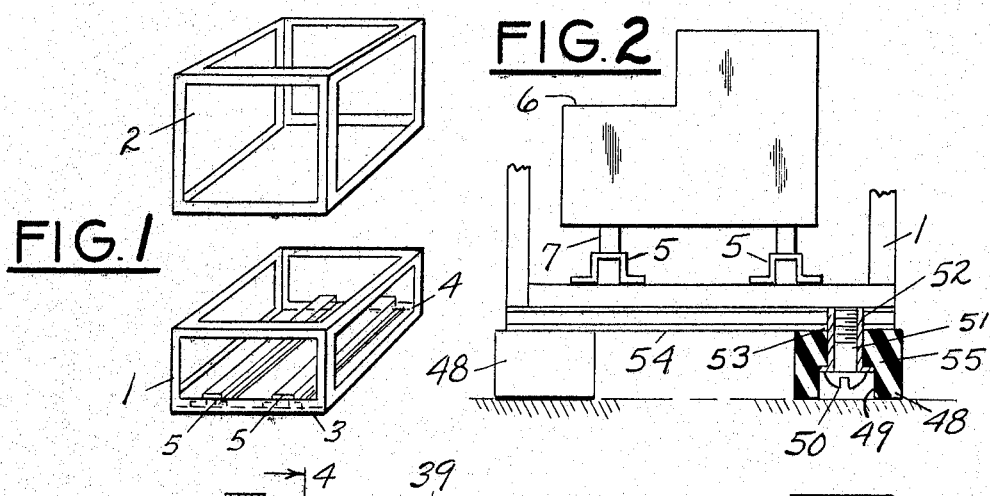
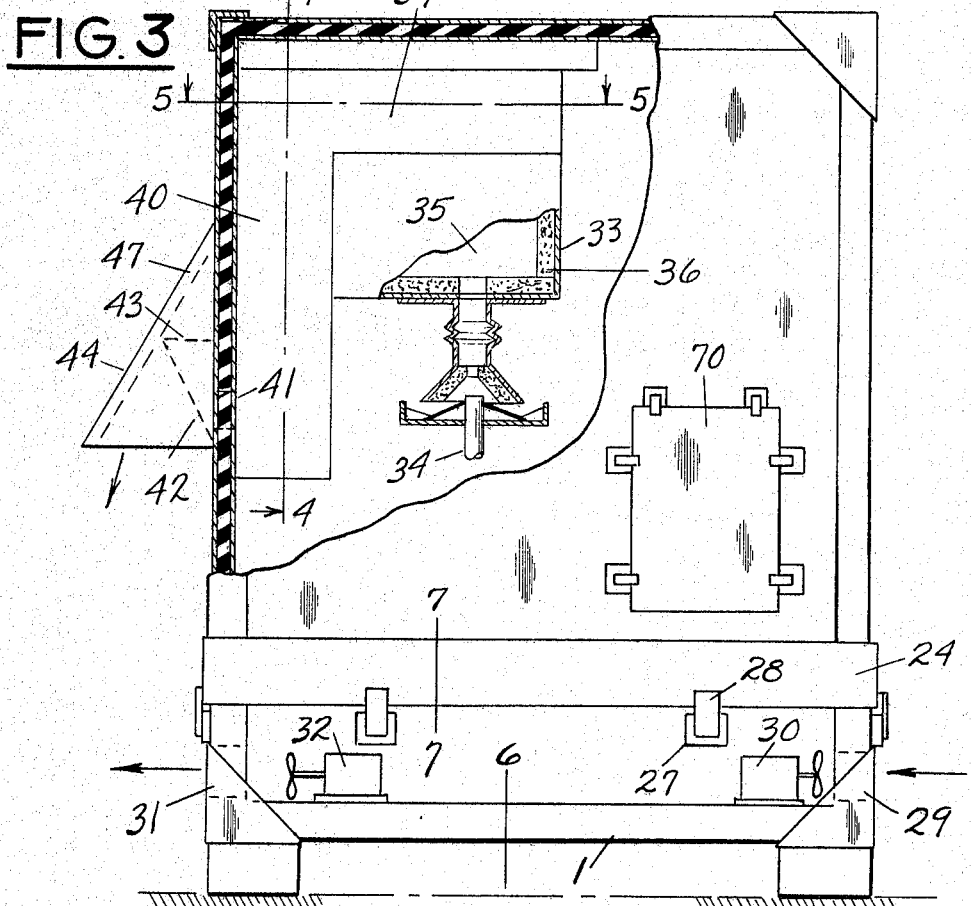
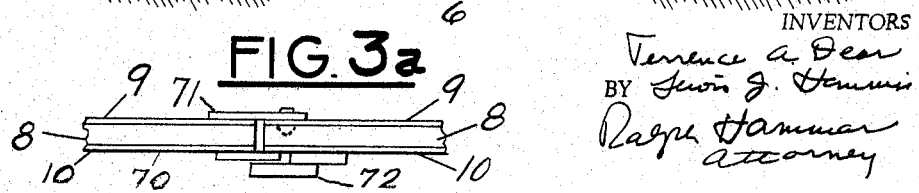
INVENTORS
Terrence A. Dear
Lewis J. Hammer
BY Ralph Hammer
Attorney Oct. 4, 1966   T. A. DEAR ET AL   3,276,539
SOUND ISOLATING ENCLOSURE FOR INTERNAL
COMBUSTION ENGINE GENERATOR SET
Filed Dec. 23, 1965   3 Sheets-Sheet 2
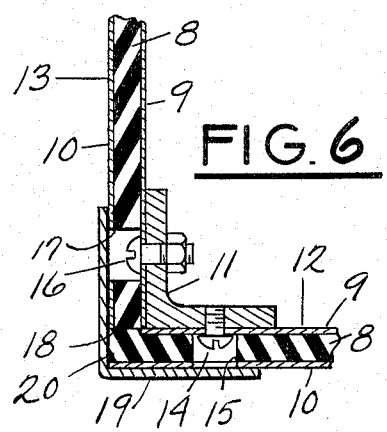
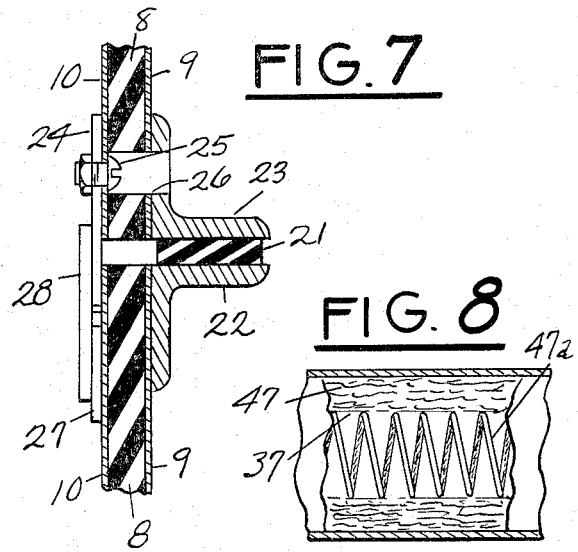
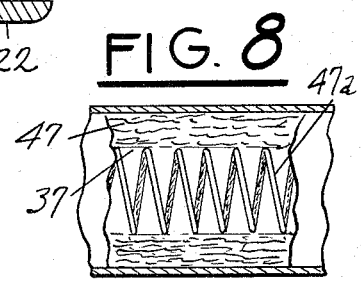
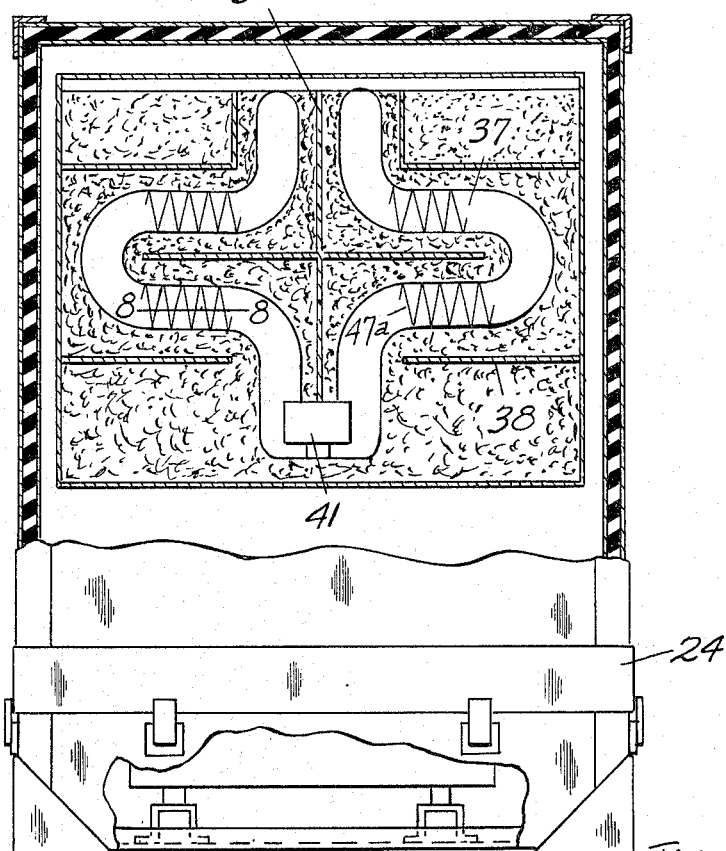
INVENTORS
Terrence A. Dear
Lewis J. Hennis
BY
Ralph Hammar
Attorney Oct. 4, 1966 T. A. DEAR ET AL 3,276,539
SOUND ISOLATING ENCLOSURE FOR INTERNAL
COMBUSTION ENGINE GENERATOR SET
Filed Dec. 23, 1965 3 Sheets-Sheet 3

INVENTORS
Terrence A. Dear
BY Lewis J. Hemmis
Ralph Hammar
attorney

United States Patent Office 3,276,539
Patented Oct. 4, 1966

3,276,539
SOUND ISOLATING ENCLOSURE FOR INTERNAL COMBUSTION ENGINE GENERATOR SET
Terrence A. Dear, Erie, and Lewis J. Hemmis, Wesleyville, Pa., assignors to Lord Corporation, Erie, Pa., a corporation of Pennsylvania
Filed Dec. 23, 1965, Ser. No. 516,072
4 Claims. (Cl. 181—33)

This invention is a mounting system and acoustic enclosure for preventing the transmission of vibration and sound. In a preferred form, the enclosure is used for an internal combustion driven engine generator set and includes a muffler. The muffler may be a separate accessory.

Figure 9:
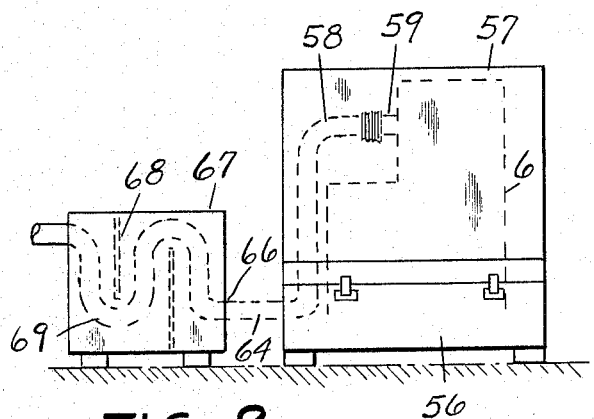
Figure 10:
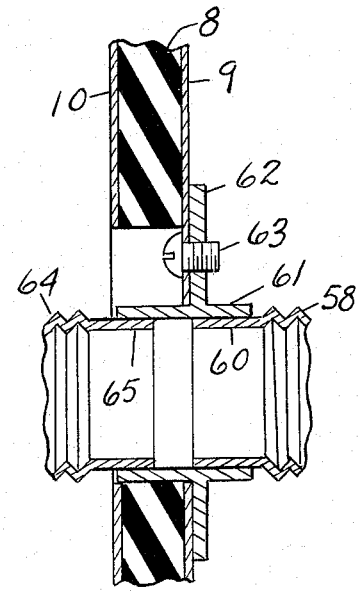
Figure 5:
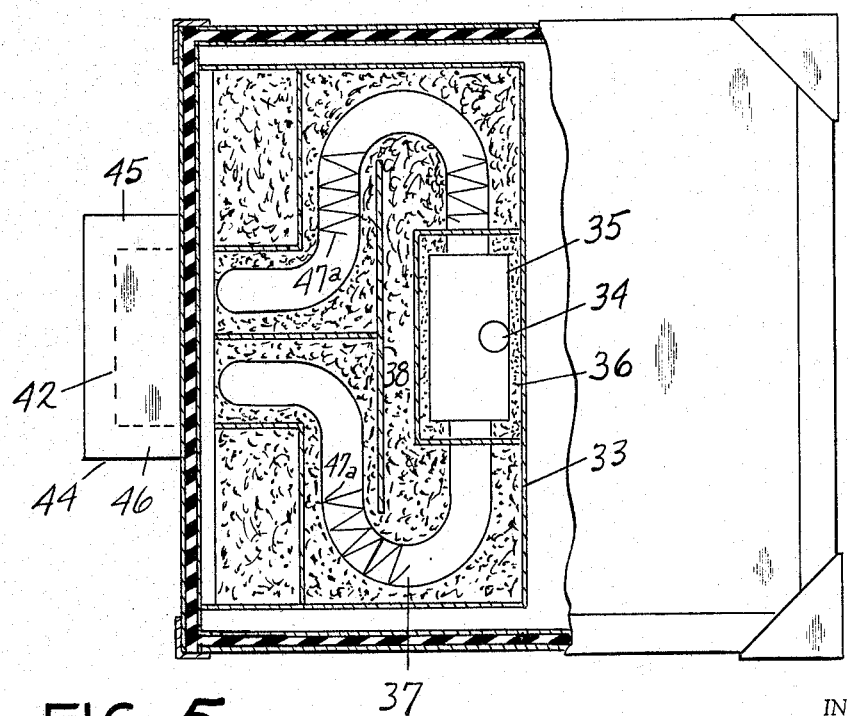

In the drawing, FIG. 1 is an exploded diagrammatic view of the frame of a machinery base and its enclosure, FIG. 2 is an elevation of the base, FIG. 3 is a front view of the complete enclosure, FIG. 3a is a detail of the access door mounting, FIG. 4 is a section on line 4—4 of FIG. 3, FIG. 5 is a section on line 5—5 of FIG. 3, FIG. 6 is a section on line 6—6 of FIG. 3, FIG. 7 is a section on line 7—7 of FIG. 3, FIG. 8 is a section on line 8—8 of FIG. 5, FIG. 9 is a diagrammatic elevation of a modification, and FIG. 10 is a section through the connection between the exhaust pipe and the enclosure for the engine generator of FIG. 9.

In the drawing, FIG. 1 is a diagrammatic view of the structural framework comprising a base structure 1 and a cover structure 2. These are made of any suitable structural material such as angle iron. In the base structure, the lowermost angles 3, 4 are bridged by cross channels 5 on which the machinery such as engine generator set 6 is mounted by vibration isolating mountings 7 as required to eliminate structure borne noise. The fans 30 and 32 for combustion and cooling air may also be mounted on the base structure.

To prevent the transmission of air borne noise from the engine generator set, both the base 1 and cover 2 are covered with sound deadening laminates comprising a thick layer of high density viscoelastic or viscous damping material 8 sandwiched between and bonded to inner and outer metal skins 9 and 10. The acoustic deadening laminates may, for example, be those disclosed in Patent 3,087,569. The function of the acoustic laminate composite construction is to reduce the transmission of sound. The laminates operate on the mass law principle. In order to reduce the sound transmission, the sound deadening laminates are connected at the corners by the structure shown in detail in FIG. 6, where 11 indicates one of the angles of the supporting frame and 12 and 13 indicate horizontal and vertical sound deadening laminates. To eliminate coupling of laminate skins, the inner skin 9 of the laminate 12 is fastened to the angle 11 by a bolt 16 having its head in a clearance hole 17. At the corner, the laminates 12 and 13 meet in a butt joint. In order to prevent transmission of sound by dynamic acoustical coupling from the inner skins 9, one of the skins is cut away at 18 to break the connection between the inner and outer skins of the abutting laminate. The assembly is completed by a corner cap 19 fixed to the outer skins and overlapping the edge 20 of the laminate 12. The purpose of the corner cap 19 is to contain or prevent leakage or flow of the viscous material 8 from between the skins, and to protect laminate edges without coupling laminate skins across the viscoelastic layer. By this structure, the sound deadening laminates are attached to the framework without any vibration or sound transmitting connection between the inner and outer skins. The structure of FIG. 6 is typical of the joints between the edges of abutting sound deadening laminates and is used for the laminates covering the base frame 1 and cover 2.

FIG. 7 shows the sound isolating connection between the base frame and cover. This connection must be detachable in order that the cover may be removed for service.

A non-metallic or sound deadening gasket 21 is arranged between angles 22 and 23 respectively at the upper and lower edges of the base and cover. The purpose of the gasket 21 is to prevent direct transmission of structureborne sound from the base to the cover and to seal the joint between the frame members 22 and 23 to cut off or block the transmission of air borne noise. The inner skins 9 of the laminates are suitably attached to the frame members 22 and 23, for example, by the construction shown in FIG. 6. The mechanical connection between the cover and base comprises a molding 24 having its upper edge fastened to the outer skin 10 of the cover laminates by means of screws 25 having heads in counterbores 26 and having its lower section depending past the joint between the outer skins of the base and cover laminates. At suitable points around the periphery of the cover are releasable pressure exerting latch connections comprising a latch member 27 attached to the outer skin 10 of a base laminate and a latch member 28 attached to the molding strip 24. The latch members 27 and 28 are diagrammatically shown and may be of any suitable construction.

By the construction so far described, vibrations of the engine generator set and structure borne sound resulting therefrom are isolated by the resilient mountings 7 and air borne noise is isolated by the sound deadening laminates attached to the cover and base. In addition, combustion and cooling air is required for the internal combustion engine and a muffler is required for the exhaust gases.

The combustion and cooling air is drawn into the enclosure through an opening 29 by a fan 30 and is exhausted from the enclosure through an opening 31 by a fan 32. The fans 30 and 32 are suitably supported on the base frame 1. The noise and vibration produced by the fans is small compared to the engine generator set and is in a frequency spectrum which is rapidly attenuated without any special treatment.

The exhaust gases are a major source of noise and require substantial sound deadening treatment. This is provided by a muffler having external walls 33 fastened to the inner skin 9 of one of the sound deadening curtains of the cover. The exhaust gases enter the muffler through an exhaust pipe 34 discharging into an expansion or plenum chamber 35 lined with a sound absorbing material such as felted glass fiber insulation 36. The chamber 35 allows the expansion of the exhaust gases and smooths out the pulsations. In addition, there is some absorption of the exhaust noise by the felted glass fibers 36. The exhaust gases leave the plenum chamber 35 through two tortuous paths 37 which wind around baffles 38 suitably fixed to the muffler walls 33 and extend generally along the top 39 and down the sides 40 of the muffler joining at an exhaust opening 41 leading to an upwardly directed nozzle 42 fixed to the outer skin 10 of the curtain wall. The discharge end 43 of the nozzle 42 is covered by a reversely directed roof or deflector 44 which keeps moisture out of the nozzle 42 and also causes the exhaust gases to again divide and to be discharged through passageways 45, 46 on each side of the reversely or oppositely directed nozzle 42. The deflector 44 is lined with fiberglass 47 which absorbs some of the noise.

In order to increase the efficiency of the muffler, the felted glass fiber insulation 47 is laid with its fibers extending generally parallel to the length of the passages 37 as shown in FIG. 8. The fibers have a substantial spring rate transverse to their length, but such an orientation of these fibers is desirable since it significantly increases the effectiveness of sound absorption. To counteract the effective spring rate and to obtain the desired absorption performance, the glass fiber is laid around a coil spring 47a which prevents blocking of the passageways 37 and maintains the required cross section for air flow without creating undue back pressure upon the engine generator.

Additional sound isolation is provided by elastomeric feet 48 having lower ends recessed at 49 to receive the head 50 of a screw 51. The screw is threaded into the base structure 1, but sound and vibration are isolated by a metallic sleeve 52 passing through a bore 53 in the sound deadening laminate which isolates the laminate from the structure attachment and by the section 55 of elastomer clamped between the head 50 of the screw 51 and the under side of the laminate 54. This configuration provides support for the feet at the prime structure so that they are not dependent upon the laminate for structural support.

In the modification of FIGS. 9 and 10, the enclosures for the engine generator set and the muffler are two separate units, each having its own structural frame and sound deadening treatment. By this construction, each can be designed for its own noise and vibration content, thereby realizing significant weight advantages from the mass law design parameters. Also, the thermal problem is much simpler because the heat of the exhaust gases is not confined within the enclosure for the motor generator, and the muffler does not act as a heat sink adjacent to engine generator and electronics elements whose thermal sensitivity is critical to performance. The heat sink is located remotely where the hardware environment is essentially thermally insensitive.

In the modification, the engine generator set 6 is supported within an enclosure comprising a base unit 56 and a cover unit 57 each constructed in the same manner as the previously described construction but the cover unit being significantly smaller and reduced in weight because there is no muffler within this enclosure. The sound deadening laminates forming the side walls of the enclosures 56, 57 are designed for the noise and vibration content of the engine generator set only, eliminating the low frequency design parameters associated with the muffler. The exhaust gases leave the engine through a flexible pipe 58 in the form of a metallic bellows which will stand high temperatures of the exhaust gases. The bellows are necessary to prevent forced excitation of the laminates. One end of the exhaust pipe is fastened at 59 to the engine and the other end 60 of the exhaust pipe fits in a sleeve 61 having a flange 62 secured by screws 63 to the inner skin 9 of one of the sound deadening laminates of the base section 56. It will be noted that the technique for fastening the sleeve 61 is similar to that used for attaching the sound deadening laminates to the structural frame as shown in FIG. 6. Another flexible exhaust pipe 64 has one end 65 telescoped into the exit end of the sleeve 61 and has its other end 66 telescoped into a similar sleeve connected to the muffler section 67. If there is significant sound radiation from the exhaust pipe 64, a noise reduction treatment may be applied.

The muffler section comprises a suitable frame carrying baffle sections 68 defining one or more serpentine passages 69 similar to the passages 37. The muffler section is of the absorptive type as in the previously described muffler and has glass fiber felt surrounding a coil spring similar to the coil spring 47a which extends substantially the full length of the passageway 69. The coil spring prevents blocking of the passageway in the manner described previously. The spaces between the coils of the spring allow the exhaust gases to impinge on and flow between the fibers of the glass felt in an undulating manner. The fibers extend transverse to the radius of the coils of the spring, the direction for most efficient sound absorption.

The enclosure for the engine generator set may have an access door 70 (FIGS. 1, 3a) of the sound deadening laminate 8, 9, 10 used for the enclosure. The door is seated in a frame 71 attached to the inner skin 9 of one of the enclosure laminates and is held in place by suitable latches 72 fixed to the outer skins 10 of the laminates.

What is claimed as new is:

1. A sound isolating structure for an internal combustion engine generator set, comprising a base frame, a cover frame, said frames having mating lips, sound deadening laminates overlying the respective frames and forming an enclosure when the frames are assembled with the lips mated to each other, said laminates comprising inner and outer skins and a layer of high density viscoelastic material sandwiched between the skins, means spaced from the outer skins for attaching the inner skins to the respective frames, the joints between adjacent laminates being formed by one laminate overlapping the edge of the adjacent laminate and the inner skin of said one laminate being cut away in the region of overlap to prevent dynamic acoustical coupling of said edge of the adjacent laminate, means spaced from the inner skins for joining the external skins of adjacent laminates at the joints, a molding overlapping the joint between said lips, means spaced from the inner skins of laminates on one of the frames for attaching the molding to the outer skins of the laminates of said one frame, means spaced from the inner skin of the laminates on the other frame for connecting the molding to the outer skins of the laminates on the other frame, structure borne noise isolating means on the base frame adapted to support the engine generator set, inlet and outlet passageways for conducting combustion and cooling air into and out of the enclosure, a muffler enclosure surrounded by sound deadening laminates, an inlet to and an outlet from the muffler enclosure, a coil spring defining a serpentine path between said inlet and outlet, glass fiber felt overlying the coil spring, the coils of the spring being spaced from each other and the fibers of the felt extending transverse to the radius of the coils.

2. The structure of claim 1 in which the muffler enclosure is within the first mentioned enclosure.

3. The structure of claim 1 in which the muffler enclosure is outside the first mentioned enclosure.

4. The structure of claim 1 having in addition supporting feet for the base, said feet being outside one of the panels overlying the base frame and being connected to the base frame by force transmitting connections extending through the skins of the laminate, and sound deadening material between said force transmitting connections and the outer skin.

References Cited by the Examiner

UNITED STATES PATENTS

| | | | |
|---|---|---|---|
| 2,355,208 | 8/1944 | Devol et al. | 181—33 |
| 3,110,369 | 11/1963 | Ruzicka | 181—33 |

FOREIGN PATENTS

| | | |
|---|---|---|
| 1,208,482 | 9/1959 | France. |
| 357,147 | 9/1931 | Great Britain. |

RICHARD B. WILKINSON, *Primary Examiner.*